(12) United States Patent
Graton et al.

(10) Patent No.: US 6,179,715 B1
(45) Date of Patent: *Jan. 30, 2001

(54) TORSIONAL DAMPER, IN PARTICULAR FOR MOTOR VEHICLE CLUTCH FRICTION

(75) Inventors: Michel Graton, Paris; Fabrice Tauvron, Athis-Mons, both of (FR)

(73) Assignee: Valeo (FR)

( * ) Notice: Under 35 U.S.C. 154(b), the term of this patent shall be extended for 0 days.

This patent is subject to a terminal disclaimer.

(21) Appl. No.: 09/230,515

(22) PCT Filed: May 28, 1998

(86) PCT No.: PCT/FR98/01069

§ 371 Date: Jan. 27, 1999

§ 102(e) Date: Jan. 27, 1999

(87) PCT Pub. No.: WO98/54488

PCT Pub. Date: Dec. 3, 1998

(30) Foreign Application Priority Data

May 30, 1997 (FR) .................................................. 97 06658

(51) Int. Cl.$^7$ ....................................................... F16D 3/12
(52) U.S. Cl. ........................... 464/68; 464/63; 192/213.12
(58) Field of Search ........................ 192/213.12, 213.11, 192/213.22, 213.21; 464/68, 67, 66, 63

(56) References Cited

U.S. PATENT DOCUMENTS

| | | | |
|---|---|---|---|
| 4,969,855 | * 11/1990 | Graton et al. | 192/213.12 |
| 5,240,458 | 8/1993 | Linglain et al. . | |
| 5,249,660 | * 10/1993 | Feldhaus et al. | 464/68 |
| 5,795,230 | * 8/1998 | Lefevre | 464/68 |
| 5,885,160 | * 3/1999 | Tauvron | 464/63 |

FOREIGN PATENT DOCUMENTS

| | | |
|---|---|---|
| 19536866 | 11/1996 | (DE) . |
| 0732525 | 4/1996 | (EP) . |
| 2735548 | 12/1996 | (FR) . |

* cited by examiner

Primary Examiner—Lynne H. Browne
Assistant Examiner—Aaron Dunwoody
(74) Attorney, Agent, or Firm—Liniak, Berenato, Longacre & White

(57) ABSTRACT

A torsion damper for a motor vehicle clutch comprising, between an entrance component (11) and an exit component (12), a pre-damper (C), an intermediate damper (B) and a main damper (A). The intermediate damper (B) guide washer (20B), axially furthest from the main damper (A) disk (22A) has axial pins (33) to block it rotation on said disk (22A) passing right through said disk (22A), and which, shaped like hooks (35) capable of elastic deformation beyond said disk (22A), can be engaged on the latter to constitute a subassembly.

14 Claims, 3 Drawing Sheets

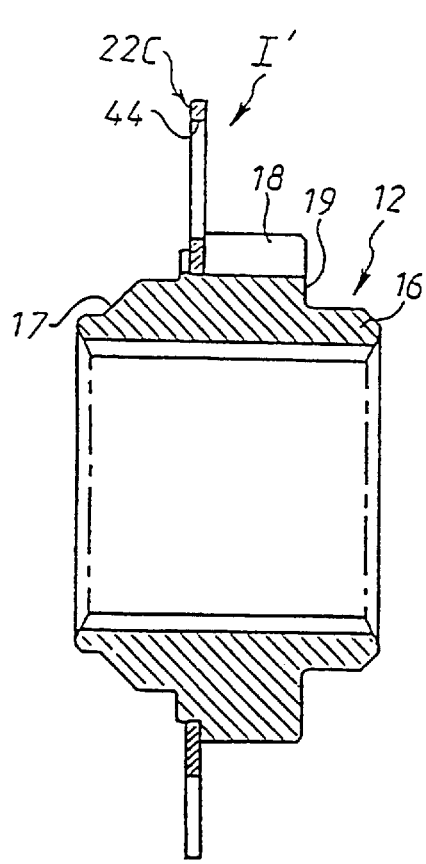
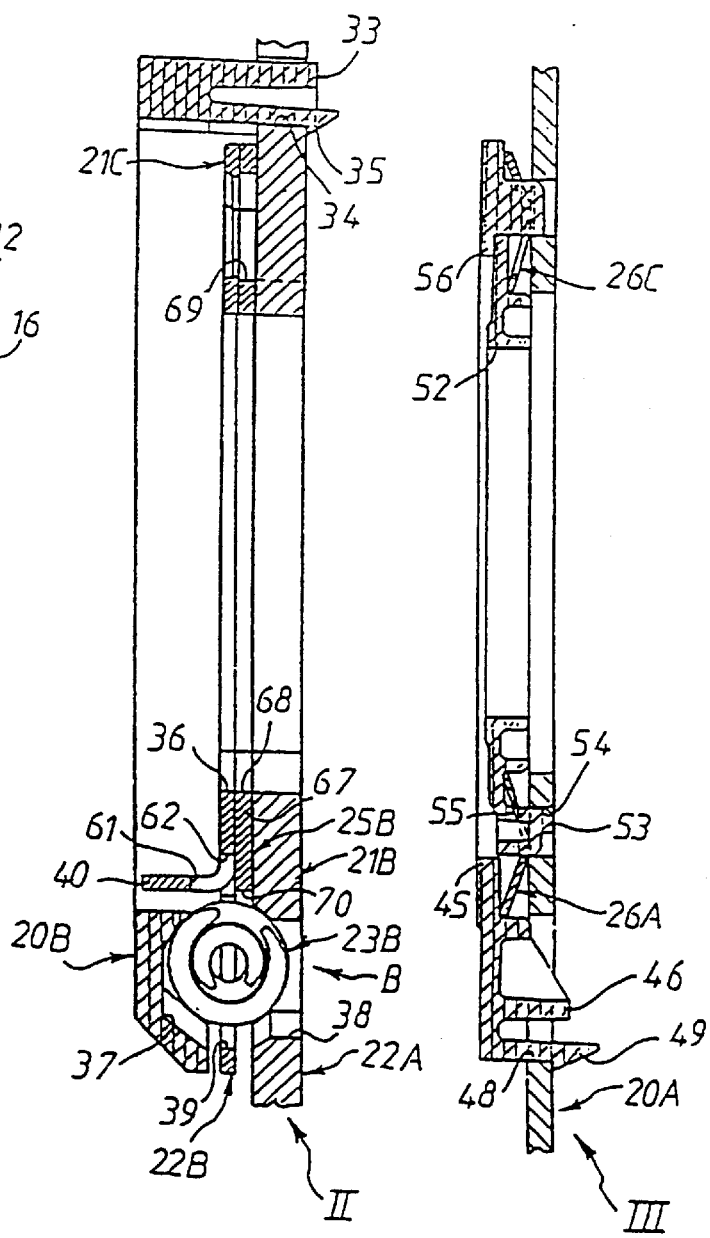
FIG.3   FIG.4   FIG.5

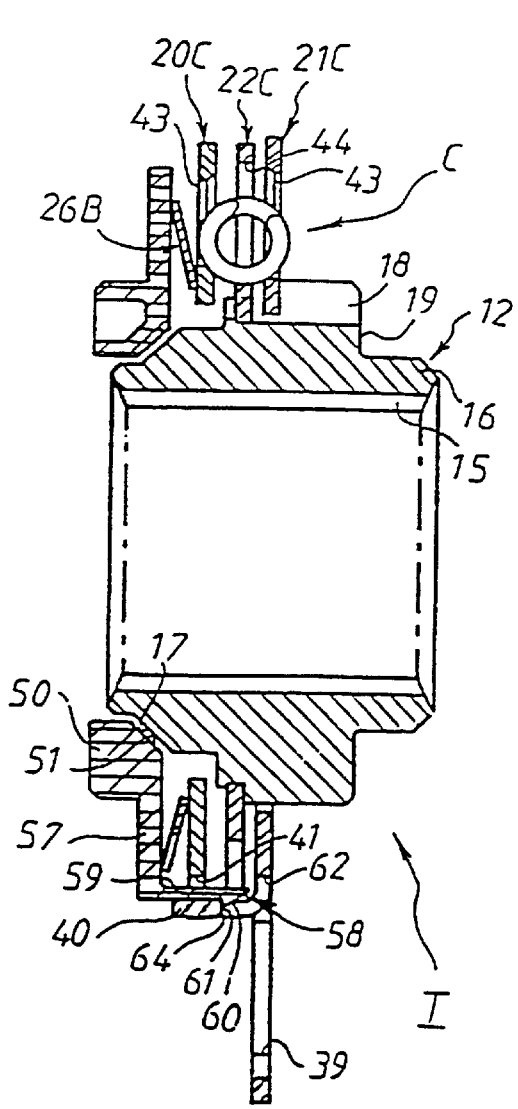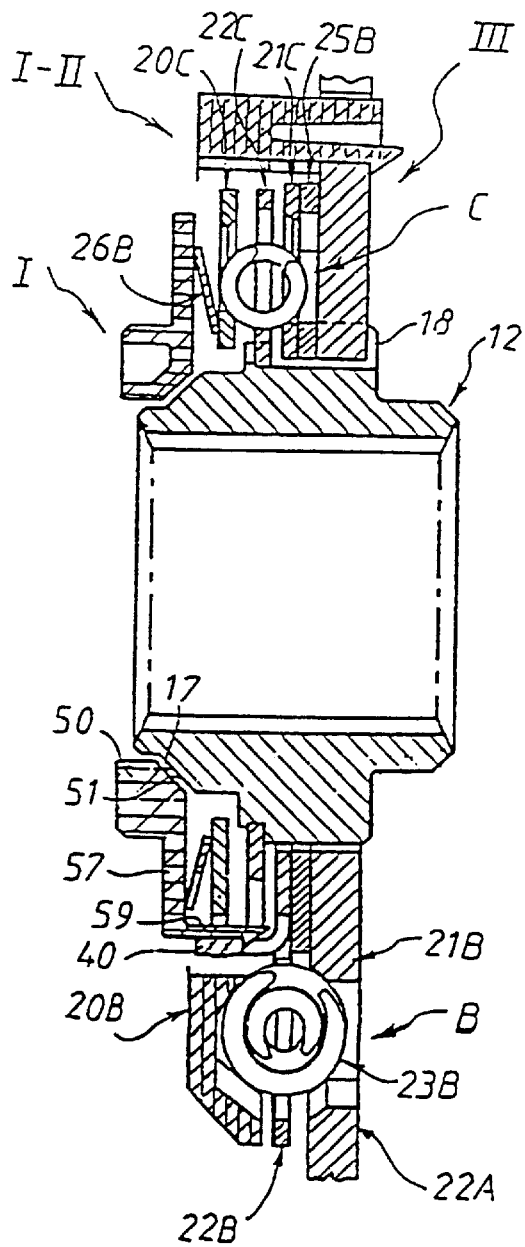

TORSIONAL DAMPER, IN PARTICULAR FOR MOTOR VEHICLE CLUTCH FRICTION

BACKGROUND OF THE INVENTION

1. Field of the Invention

The invention concerns torsional damper devices of the type used in the construction of a motor vehicle friction clutch, for example.

2. Description of Related Art

Torsional damper devices of the above kind usually include, between an input member and an output member rotatable relative to each other, two dampers which, in kinematic terms, come into action successively upon relative angular movement between the input member and the output member, namely, in the reverse order to that in which they come into action, a main damper and a pre-damper, each of these dampers including two guide washers which, disposed on respective opposite axial sides of a web, are rotatable relative to the web, circumferentially acting spring means disposed circumferentially between the guide washers and the web, and friction means which, operative between the guide washers and the web or parts constrained to rotate therewith, are acted on by axially acting spring means.

In the construction of a friction clutch the input member is for example a disc which carries friction linings at its periphery which are clamped between the pressure plate and the reaction plate of the clutch and the output member is for example a hub adapted to be constrained to rotate with the input shaft of a gearbox.

The function of the dampers is to filter out vibrations caused by the engine, when idling in the case of the pre-damper and in normal operation in the case of the main damper.

To satisfy particular operating conditions document FR-A-2 735 548, to which this patent application explicitly refers, proposes the provision of a third or intermediate damper which comes into action after the pre-damper and before the main damper.

The above document also proposes pre-assembly of some of the components to form sub-assemblies, in order to reduce assembly time.

Accordingly, a first sub-assembly, in which the pre-damper is pre-assembled to the output member and/or a second sub-assembly in which a friction washer forming part of the friction means of the main damper is pre-assembled to the guide washer of the main damper at the shorter distance from the friction washer can be provided, if required.

SUMMARY OF THE INVENTION

The aim of the invention is to develop a sub-assembly form of construction of the above kind to reduce assembly time further.

To be more precise, it consists in a torsional damper device of the kind briefly described hereinabove and which includes an intermediate damper, said torsional damper device being generally characterised in that the guide washer of the intermediate damper at the greater axial distance from the web of the main damper has axial tenons constraining it to rotate with said web and said tenons pass completely through said web, are shaped to form elastically deformable hooks beyond said web and are adapted to clip onto said web.

Accordingly, if required, a third sub-assembly can advantageously be constructed within the torsional damper device comprising the web of the main damper, the web of the intermediate damper, the circumferentially acting spring members of the intermediate damper and the guide washer of the intermediate damper at the greater axial distance from the web of the main damper, with a friction washer between the web of the main damper and that of the intermediate damper.

The axially acting spring means of the intermediate damper are advantageously operative between the guide washer of the pre-damper at the greater axial distance from the web of the main damper and a retaining washer with coupling means adapted to operate axially between said retaining washer and the guide washer of the pre-damper at the shorter axial distance from the web of the main damper.

Accordingly the axially acting spring means of the intermediate damper are advantageously joined onto the first sub-assembly.

If, as disclosed in document FR-A-2 735 548, the guide washer of the pre-damper at the shorter axial distance from the web of the main damper is formed by the web of the intermediate damper, this latter web is shared by the first sub-assembly and the third sub-assembly and if required these two sub-assemblies can then together form part of a larger sub-assembly, to the further benefit of assembly time.

BRIEF DESCRIPTION OF THE DRAWINGS

The features and advantages of the invention will emerge from the following description given by way of example and with reference to the accompanying diagrammatic drawings, in which:

FIGS. 3 through 7 are views in axial section relating to respective sub-assemblies that can be formed from certain of the components of the torsional damper device.

DETAILED DESCRIPTION OF THE PREFERRED EMBODIMENTS

Figure 1:
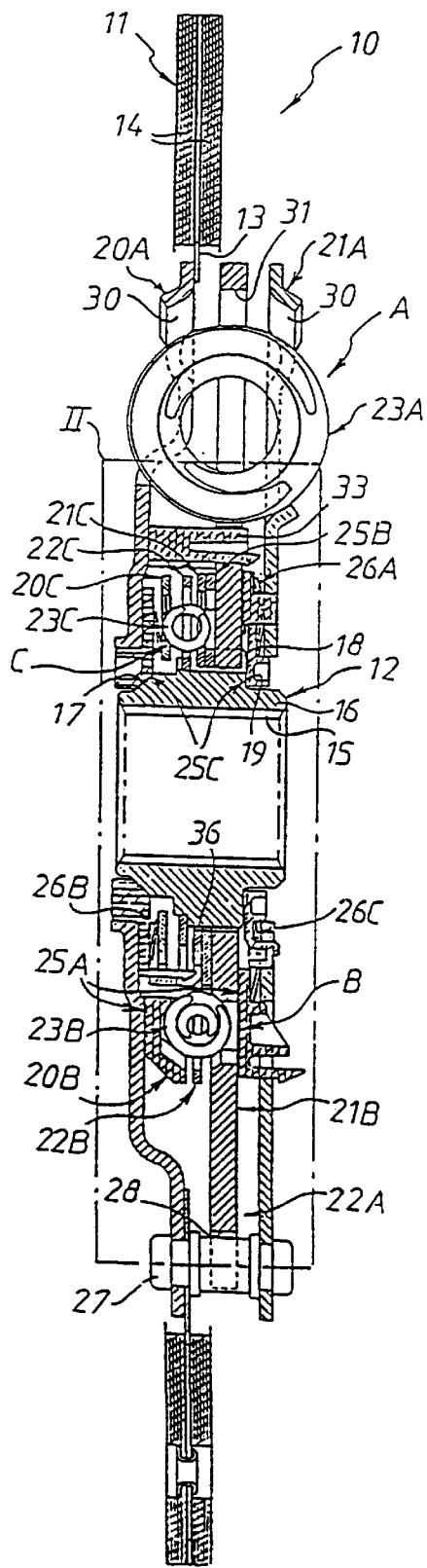
FIG. 1 is a view in axial section of a torsional damper device in accordance with the invention.
Figure 2:
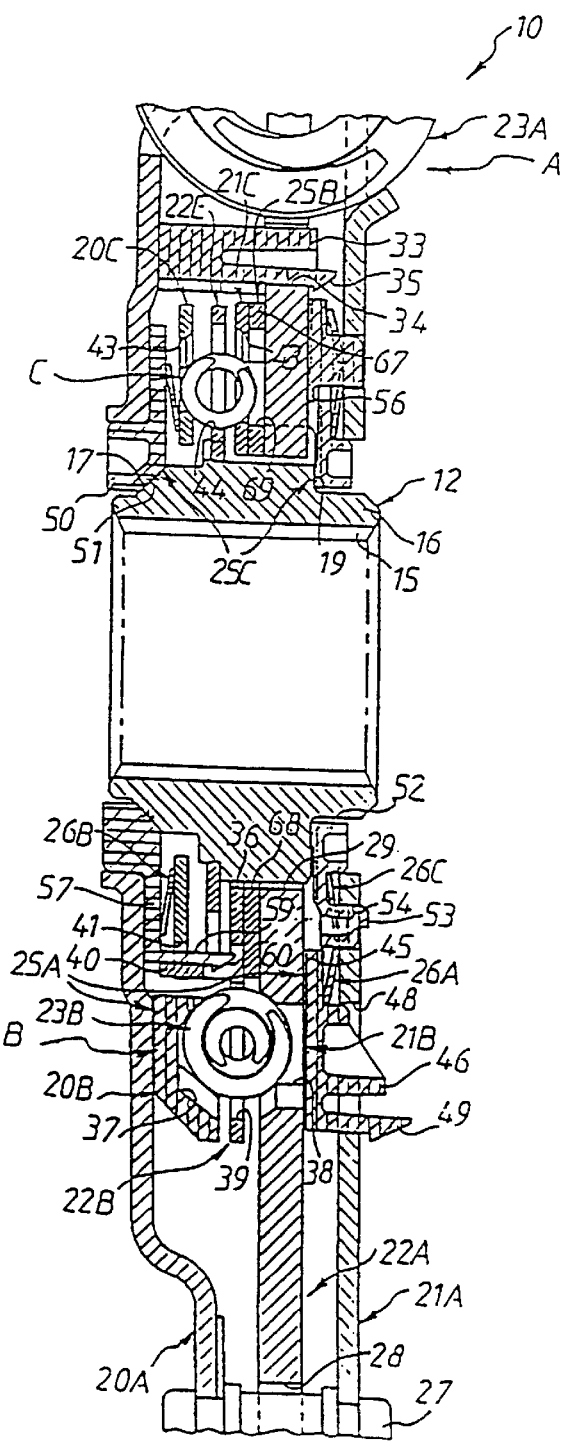
FIG. 2 shows the detail II from FIG. 1 to a larger scale.

The figures show a torsional damper device 10 of the type described in the previously mentioned document FR-A-2 735 548.

Accordingly the torsional damper device 10 does not need to be described in complete detail here and, as and when required, the description of document FR-A-2 735 548 must be deemed to constitute an integral part of the present description.

The torsional damper device 10 includes three dampers A, B, C between an input member 11 and an output member 12 that are rotatable relative to each other. In kinematic terms the three dampers come into action successively upon relative angular movement between the input member 11 and the output member 12, namely, and in the reverse order to that in which they come into action, a main damper A, an intermediate damper B and a pre-damper C.

Because the present example refers to a motor vehicle friction clutch, here the input member 11 is a disc 13 carrying annular friction linings 14 at its periphery and on both faces.

Here the output member 12 is a hub with internal splines 15, a reduced height external portion 16 at one end and an external frustoconical bearing surface 17 at the other end, with splines 18 between them.

At the same end as the reduced height portion 16 the output member 12 has a transverse shoulder 19 continuous with the corresponding end edge of the splines 18.

The dampers A, B, C each comprise respective pairs of guide washers 20A–21A, 20B–21B, 20C–21C which, on respective opposite axial sides of a respective web 22A, 22B, 22C, can rotate relative to the web within particular relative angular movement limits, respective circumferentially acting spring means 20A, 23B, 23C disposed circumferentially between the guide washers 20A–21A, 20B–21B, 20C–21C and the web 22A, 22B, 22C and respective friction means 25A, 25B, 25C operative between the guide washers 20A–21A, 20B–21B, 20C–21C and the web 22A, 22B, 22C or parts constrained to rotate therewith, are acted on by respective axially acting spring means 26A, 26B, 26C.

Here the guide washers 20A, 21A of the main damper A are fastened together and held a particular distance apart by spacers 27 at their periphery and by which the disc 13 carrying the friction linings 14 is fastened to the guide washer 20A.

The spacers 27 pass with circumferential clearance through notches 28 provided for this purpose at the outside periphery of the web 22A and co-operate with the ends of the notches 28 to define the limits of angular movement of the guide washers 20A, 21A relative to the web 22A.

The web 22A also has notches 29 at its inside periphery, through which it meshes with circumferential clearance with the splines 18 of the output member 12.

The circumferentially acting spring means 23A of the main damper A are partly located inside windows 30 in the guide washers 20A, 21A and partly inside facing windows 31 in the web 22A.

Here each comprises two elongate coaxial coil springs substantially tangential to a circumference of the assembly.

Here the intermediate damper B and the pre-damper C are both on the same axial side of the web 22A of the main damper A, between that web 22A and the guide washer 20A.

They are therefore both axially between the guide washers 20A, 21A of the main damper A.

The intermediate damper B, which surrounds the pre-damper C, is for the most part radially under, i.e. short of, the circumferentially acting spring means 23A of the main damper A.

Its guide washer 21B is formed by the web 22A of the main damper A, to be more precise by the radially innermost portion of that web 22A.

Its guide washer 20B is a synthetic material confinement member disposed axially in contact with the guide washer 20A of the main damper A.

The guide washer 20B, which is the guide washer of the intermediate damper B at the greater axial distance from the web 22A of the main damper A, has axial tenons 33 constraining it to rotate with the web 22A, the tenons 33 engaging with notches 34 provided for this purpose in the edges of the windows 31 in the web 22A.

In accordance with the invention the tenons 33 pass completely through the web 22A, are shaped to form elastically deformable hooks 35 beyond the web 22A and are adapted to clip onto the web.

At its inside periphery the web 22B has notches 36 which mesh with circumferential clearance with the splines 18 on the output member 12, but the clearance here is less than that of the web 22A of the main damper A.

The circumferentially acting spring means 23B of the intermediate damper B are engaged partly in recesses 37 in the guide washer 20B and in windows 38 in the guide washer 21B and partly in facing windows 39 in the web 22B.

Here each comprises two elongate coaxial coil springs substantially tangential to a circumference of the assembly.

Here the limits of relative angular movement between the guide washers 20B, 21B of the intermediate damper B and the web 22B thereof are defined by the circumferential ends of the notches 29 in the web 22A of the main damper A abutting on the splines 18 of the output member 12.

Here one of the guide washers 20C, 21C of the pre-damper C is formed by the web 22B of the intermediate damper B, to be more precise by the radially innermost portion of that web 22B.

Here it is the guide washer 21C at the shorter axial distance from the web 22A of the main damper A.

The two guide washers 20C, 21C of the pre-damper C are constrained to rotate together by axial lugs 40 on one of them engaged with corresponding notches 41 on the other of them.

Here the guide washer 20C, 21C with the axial lugs 40 is the guide washer 21C at the shorter axial distance from the web 22A of the main damper A and the notches 41 are at the outside periphery of the guide washer 20C.

The axial lugs 40 therefore extend away from the web 22A of the main damper A.

Here the axial lugs 40 are formed in windows 39 of the web 22B of the intermediate damper B, the material constituting them normally being removed in forming the windows 39 (FIG. 4).

Here the web 22C of the pre-damper C is constrained to rotate with the output member 12, its inside periphery being engaged with and crimped to a reduced height portion of the splines 18 of the output member 12.

The circumferentially acting spring members 23C of the pre-damper C are partly engaged in windows 43 in the guide washers 20C, 21C and partly in facing windows 44 in the web 22C.

Here each comprises an elongate coil spring substantially tangential to a circumference of the assembly.

Here the limits of relative angular movement between the guide washers 20C, 21C of the pre-damper C and its web 22C are defined by circumferential ends of the notches 36 in the web 22B of the intermediate damper B abutting against the splines 18 of the output member 12.

The friction means 25A of the main damper A include, in addition to the guide washer 20B of the intermediate damper B, a friction washer 45 on the opposite side of the web 22A to the guide washer 20B and in contact with the web 22A.

The associated axially acting spring means 26A are here in the form of a Belleville washer that bears on the corresponding guide washer 21A of the main damper A.

Here the friction washer 45 is substantially leveL with the guide washer 20B and therefore at a distance from the output member 12.

Here the friction washer 45 has axial tenons 46 which are offset radially away from the output member 12 and constrain it to rotate with the nearer guide washer 21A of the main damper A, the tenons 46 engaging with openings 48 provided for this purpose in the guide washer 21A.

The tenons 46 advantageously pass completely through the guide washer 21A, are shaped as elastically deformable hooks 49 beyond the guide washer 21A and are adapted to clip onto the guide washer.

The tenons 46 are also used to centre the Belleville washer constituting the axially acting spring means 26A.

Here the friction means 25C of the pre-damper C include, on the one hand, a bearing 50 operative between the output member 12 and one of the guide washers 20A, 21A of the main damper A, here the guide washer 20A, to centre the guide washer 20A, and which has a frustoconical bearing surface 51 through which it bears on the frustoconical bearing surface 17 of the output member 12 and, on the other hand, a friction washer 52 at the other end of the output member 12 which bears on the transverse shoulder 19 of the output member 12, possibly through an intermediate washer, not shown.

The friction washer 52 has axial tenons 53 constraining it to rotate with the guide washer 21A of the main damper A, the tenons 53 engaging with notches 54 provided for this purpose at the inside periphery of the guide washer 21A.

Similarly, the bearing 50 is constrained to rotate with the guide washer 20C of the pre-damper C by tenons that cannot be seen in the figures.

Here the associated axially acting spring means 26C are formed by a Belleville washer which is centred by the tenons 53 with which it is engaged via notches 55.

For reasons that will become apparent hereinafter, the friction washer 45 forming part of the friction means 25A of the main damper A has a radial extension 56 towards the axis of the assembly adapted to retain the friction washer 52 that is part of the friction means 25C of the pre-damper C.

The radial extension 56 can be circumferentially continuous or subdivided into radial lugs.

In accordance with the invention the axially acting spring means 26B of the intermediate damper B are operative between the guide washer 20C of the pre-damper C at the greater axial distance from the web 22A of the main damper A and a retaining washer 57 with coupling means 58 operative axially between the retaining washer 57 and the guide washer 21C of the pre-damper C at the shorter axial distance from the web 22A of the main damper A.

Here the coupling means 58 comprise axial lugs 59 on the retaining washer 57 extending towards the web 22A of the main damper A and shaped to form hooks 60 at their ends and detents 61 on the guide washer 21C of the pre-damper C at the shorter axial distance from the web 22A of the main damper A.

Here the detents 61 are each formed by the edge of an opening 62 provided for this purpose in the axial lugs 40 of the guide washer 22C of the pre-damper C.

Here the axial lugs 40 of the guide washer 22C extend a right-angle lip 64 on the guide washer 22C against which the guide washer 20C abuts in the axial direction.

Here the retaining washer 57 is one piece with the bearing 50 and the axially acting spring means 26B of the intermediate damper B comprise a Belleville washer centred by the tenons constraining the bearing 50 to rotate with the guide washer 20C of the pre-damper C, which has notches engaged with the tenons.

The friction means 25B of the intermediate damper B comprise a friction washer 67 disposed axially between the web 22A of the main damper A and the web 22B of the intermediate damper B.

Here the friction washer 67 meshes with clearance with the output member 12.

To this ends its inside periphery incorporates notches 68 engaging with clearance on the splines 18 of the output member 12.

Here the friction washer 67 has windows 69 in which the circumferentially acting spring members 23C of the pre-damper C are axially engaged, which reduces the overall axial size of the assembly.

The corresponding arrangements are described in document EP-A-0 732 525 which may be referred to for more information, in particular with regard to the width of the windows 69.

Here the outside periphery of the friction washer 67 incorporates notches 70 in which the circumferentially acting spring members 23B of the intermediate damper B are axially engaged, so that the friction washer 67 is subject to a return spring effect of the circumferentially acting spring members 23B.

It follows from the foregoing description that various sub-assemblies are constituted or can be constituted within the torsional damper device 10.

Firstly there is a first sub-assembly I comprising the output member 12, the pre-damper C, the axially acting spring means 26B of the intermediate damper B and the retaining washer 57, the web 22C of the pre-damper C being axially keyed to the output member 12 to retain the assembly relative to it.

The first sub-assembly I is shown separately in FIG. 6.

Note that on the side at the axially greater distance from the web 22A of the main damper A, it is the retaining washer 57 that axially closes the first sub-assembly I.

Then there is a second sub-assembly II comprising the web 22A of the main damper A, the web 22B of the intermediate damper B, the circumferentially acting spring members 23B of the intermediate damper B and the guide washer 20B of the intermediate damper B at the greater axial distance from the web 22A of the main damper A, with the friction washer 67 forming part of the friction means 25B of the intermediate damper B between the web 22A of the main damper A and the web 22B of the intermediate damper B.

The second sub-assembly II is shown separately in FIG. 4.

Finally there is a third sub-assembly III comprising at least the guide washer 21A concerned of the main damper A, the friction washer 45 which forms part of the friction means 25A of the main damper A and is constrained to rotate with the guide washer 21A and the axially acting spring means 26A of the main damper A between the guide washer 21A and the friction washer 45.

The third sub-assembly III is shown separately in FIG. 5.

Here it also includes the friction washer 52 forming part of the friction means 25C of the pre-damper C and the axially acting spring means 26C of the pre-damper C between the friction washer 52 and the corresponding guide washer 21A of the main damper A, the friction washer 52 being retained by the radial extension 56 of the friction washer 45.

This being the case, the assembly procedure can be as follows.

As shown in FIGS. 3 through 5, for example, the first step is to produce a sub-assembly I' formed exclusively of the output member 12 and the web 22C of the pre-damper C and then to stack this sub-assembly I' with the second sub-assembly II, the third sub-assembly III and the other components of the torsional damper device 10.

However, the first sub-assembly I described hereinabove and the second sub-assembly II preferably and advantageously share the web 22B of the intermediate damper B and the first sub-assembly I and the second sub-assembly II are first assembled separately, as shown in FIGS. 3 and 5, and then joined together.

They then form a larger sub-assembly I–II shown in FIG. 7.

The sub-assembly I–II is then stacked as previously with the third sub-assembly III and the other components of the torsional damper device 10.

The stiffness of the circumferentially acting spring members 23C of the pre-damper C is less than that of the circumferentially acting spring members 23B of the intermediate damper B which is in turn less than that of the circumferentially acting spring members 23A of the main damper A.

The stiffness of the axially acting spring means 26C of the pre-damper C is lower than that of the axially acting spring means 26B of the intermediate damper B which is in turn less than that of the axially acting spring means 26A of the main damper A.

When the input member 11 and the output member 12 rotate relative to each other in operation only the circumferentially acting spring members 23C of the pre-damper C are initially compressed.

At this time only the friction means 25C of the pre-damper C are operative.

The circumferentially acting spring members 23B of the intermediate damper B and the members 23A of the main damper A constrain the guide washers 20C, 21C of the pre-damper C to rotate with the guide washers 20A, 21A of the damper A with which the friction washer 52 constituting the friction means 25C is constrained to rotate, and likewise the bearing 50 through the intermediary of the guide washer 20C of the pre-damper C.

The circumferentially acting spring members 23B of the intermediate damper B are then compressed but the circumferentially acting spring members 23C of the pre-damper C remain compressed.

At the same time the friction means 25B of the intermediate damper B add their effects to those of the friction means 25C of the pre-damper C.

The guide washer 21B of the intermediate damper B, constrained to rotate with the output member 12, turns relative to the web 22A of the main damper A and, with a certain time-delay due to the corresponding circumferential clearance, the same goes for the friction washer 67 disposed axially between the guide washer 22B and the web 22A and forming the friction means 25B of the intermediate damper B.

Finally, the circumferentially acting spring members 23A of the main damper A are compressed but the circumferentially acting spring members 23B of the intermediate damper B and those 23C of the pre-damper C remain compressed.

At the same time, the friction means 25A of the main damper A come into action, adding their effects to those of the friction means 25C of the pre-damper C, but the friction means 25B of the intermediate damper B are not operative.

The guide washer 21C of the pre-damper C and the web 22A of the main damper A between which the friction washer 67 constituting the friction means 25B is operative are then both constrained to rotate with the output member 12.

Consequently, on relative angular movement between the input member 11 and the output member 12, the pre-damper C directly upstream of the output member 12 is the first to come into action, the intermediate damper B is the second to come into action and the main damper A, which in kinematic terms is driven directly by the input member 11, is the third and last to come into action.

It follows from the aforegoing description that the three dampers A, B, C are disposed in series.

If required their circumferentially acting spring members 23A, 23B, 23C can be pre-stressed in their respective housings (windows 30, 38, 43 or recesses 37). In this case, the torque applied by the members 23C at the end of their intervention is greater than the torque applied by the members 23B at the beginning of their intervention. The torque applied by the members 23B at the end of their intervention is greater than the torque applied by the members 23A at the beginning of their intervention.

To prevent discontinuous operation the final torque of the pre-damper C can be greater than the pre-stressing of the circumferentially acting spring member 23B of the intermediate damper B and the final torque of the intermediate damper B can be greater than the pre-stressing of the circumferentially acting spring members 23A of the main damper A.

The hooks 35, 49 are advantageously in one piece with the corresponding tenons 33, 46 and are preferably narrower than the tenons in the circumferential direction so as not to contribute to the transmission of torque, which reduces the stresses on them.

Of course, the invention is not limited to the embodiment described and shown but encompasses any variant execution within the scope of the claims.

For example the axially acting spring means employed can consist at least in part in a corrugated washer.

Also, all the embodiments disclosed in document FR-A-2 735 548 can be envisaged.

What is claimed is:

1. A torsional damper device of the kind including, between an input member (11) and an output member (12) rotatable relative to each other, three dampers (A, B, C,) which, in kinematic terms, come successively into action upon relative angular movement between said input member (11) and said output member (12), namely, in the opposite order to that in which they come into action, a main damper (A), an intermediate damper (B) and a pre-damper (C), each of said dampers (A, B, C) including two guide washers (20A–21A, 20B–21B, 20C–21C) on respective opposite axial sides of a web (22A, 22B, 22C) which are rotatable relative thereto, circumferentially acting spring members (23A, 23B, 23C) disposed circumferentially between the guide washers (20A–21A, 20B–21B, 20C–21C) and the web (22A, 22B, 22C), and friction means (25A, 25B, 25C) operative between the guide washers (20A–21A, 20B–21B, 20C–21C) and the web (22A, 22B, 22C) or parts constrained to rotate therewith, are acted on by axially acting spring means (26A, 26B, 26C), characterised in that the guide washer (20B) of the intermediate damper (B) at the greater axial distance from the web (22A) of the main damper (A) has axial tenons (33) constraining it to rotate with the web (22A) and the tenons (33) pass completely through the web (22A), are shaped to form elastically deformable hooks (35) beyond the web (22A) and are adapted to clip onto the web.

2. A torsional damper device according to claim 1 characterised in that it comprises a second sub-assembly (II) incorporating the web (22A) of the main damper (A), the web (22B) of the intermediate damper (B), the circumferentially acting spring members (23B) of the intermediate damper (B) and the guide washer (20B) of the intermediate damper (B) at the greater axial distance from the web (22A) of the main damper (A), with a friction washer (67) forming part of the friction means (25B) of the intermediate damper (B) between the web (22A) of the main damper (A) and the web (20B) of the intermediate damper (B).

3. A torsional damper device according to claim 2 characterised in that the friction washer 67 disposed between the web (22A) of the main damper (A) and the web (22B) of the intermediate damper (B) meshes with clearance with the output member (12).

4. A torsional damper device according to claim 2 characterised in that the other guide washer (21B) of the intermediate damper (B) is formed by the web (22A) of the main damper (A).

5. A torsional damper device according to claim 2 characterised in that the axially acting spring means (26B) of the intermediate damper (B) are operative between the guide washer (20C) of the pre-damper (C) at the greater axial distance from the web (22A) of the main damper (A) and a retaining washer (57) with coupling means (58) operative axially between the retaining washer (57) and the guide washer (21C) of the pre-damper (C) at the shorter axial distance from the web (22A) of the main damper (A).

6. A torsional damper device according to claim 5 characterised in that the coupling means (58) include axial lugs (59) on the retaining washer (57) extending towards the web (22A) of the main damper (A) and shaped to form hooks (60) and detents (61) on the guide washer (21C) of the pre-damper (C) at the shorter axial distance from the web (22A) of the main damper (A).

7. A torsional damper device according to claim 6 characterised in that the two guide washers (20C, 21C) of the pre-damper (C) are constrained to rotate together by axial lugs (40) on one of them engaging with notches (41) in corresponding relationship thereto on the other of them, the guide washer (20C, 21C) with the axial lugs (40) is the guide washer (21C) at the greater axial distance from the web (22A) of the main damper (A) and the detents (61) are each formed by the edge of an opening (62) provided for this purpose in the axial lugs (40).

8. A torsional damper device according to claim 5 characterised in that it comprises a first sub-assembly (I) incorporating the output member (12), the pre-damper (C), the axially acting spring means (26B) of the intermediate damper (B) and the retaining washer (57), the web (22C) of the pre-damper (C) being keyed axially to the output member (12).

9. A torsional damper device according to claim 5 characterised in that the friction means (25C) of the pre-damper (C) include a bearing (50) operative between the output member (12) and one of the guide washers (20A, 21A) of the main damper (A) and the retaining washer (57) is in one piece with the bearing (50).

10. A torsional damper device according to claim 5 characterised in that the guide washer (21C) of the pre-damper (C) at the shorter axial distance from the web (22A) of the main damper (A) is formed by the web (22B) of the intermediate damper (B).

11. A torsional damper device according to claim 10 characterised in that the first sub-assembly (I) and the second sub-assembly (II) share the web (22B) of the intermediate damper (B) and together form a larger sub-assembly (I–II).

12. A torsional damper device according to claim 1 characterised in that the friction means (25A) of the main damper (A) include a friction washer (45) with axial tenons (46) constraining it to rotate with the nearer guide washer (21A) of the main damper (A) and the tenons (46) pass completely through the guide washer (21A), are shaped to form elastically deformable hooks (49) beyond the guide washer (21A) and adapted to clip to the guide washer.

13. A torsional damper device according to claim 12 characterised in that it comprises a third sub-assembly (III) incorporating at least the guide washer (21A) concerned of the main damper (A), the friction washer (45) constrained to rotate with said guide washer (21A) and the axially acting spring means (26A) of the main damper (A) between said guide washer (21A) and said friction washer (45).

14. A torsional damper device according to claim 13 characterised in that the third sub-assembly (III) also incorporates a friction washer (52) forming part of the friction means (25) of the pre-damper (C) and the axially acting spring means (26C) of the pre-damper (C) between said friction washer (52) and the guide washer (21A), the friction washer (45) forming part of the friction means (25A) of the main damper (A) having a radial extension (56) adapted to retain the friction washer (52) forming part of the friction means (25C) of the pre-damper (C).

* * * * *